US009261209B2

(12) United States Patent
Studer et al.

(10) Patent No.: US 9,261,209 B2
(45) Date of Patent: Feb. 16, 2016

(54) FLUID COUPLING (75) Inventors: Anthony D Studer, Albany, OR (US); Bruce A McFadden, Vancouver, WA (US); Alan Shibata, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/374,897

(22) PCT Filed: Apr. 18, 2012

(86) PCT No.: PCT/US2012/034089
§ 371 (c)(1),
(2), (4) Date: Jul. 26, 2014

(87) PCT Pub. No.: WO2013/158093
PCT Pub. Date: Oct. 24, 2013

(65) Prior Publication Data
US 2014/0373959 A1    Dec. 25, 2014

(51) Int. Cl.
*F16L 3/00*    (2006.01)
*F16L 19/00*    (2006.01)
*B41J 2/175*    (2006.01)
*F16L 17/00*    (2006.01)
*B23P 19/02*    (2006.01)

(52) U.S. Cl.
CPC ................. *F16L 17/00* (2013.01); *B23P 19/02* (2013.01); *B41J 2/175* (2013.01); *B41J 2/1752* (2013.01); *B41J 2/17509* (2013.01); *B41J 2/17553* (2013.01); *Y10T 29/49826* (2015.01); *Y10T 29/53* (2015.01)

(58) Field of Classification Search
CPC .... B41J 2/175; B41J 2/17523; B41J 2/17553; B41J 2/17556; F16L 39/00; F16L 19/00; F16L 19/04
USPC .......... 347/7, 84, 85, 86; 285/123.12, 123.14, 285/124.3, 124.4
See application file for complete search history.

(56) References Cited

U.S. PATENT DOCUMENTS

| 5,874,976 | A | 2/1999 | Katon et al. |
| 5,966,155 | A | 10/1999 | Pawlowski, Jr. et al. |
| 6,033,064 | A | 3/2000 | Pawlowski, Jr. et al. |
| 6,145,971 | A | 11/2000 | Baker et al. |
| 6,164,766 | A | 12/2000 | Erickson |
| 6,183,076 | B1 | 2/2001 | Childers et al. |
| 6,188,417 | B1 | 2/2001 | Keefe et al. |
| 6,464,346 | B2 | 10/2002 | Otis, Jr. et al. |

(Continued)

FOREIGN PATENT DOCUMENTS

| EP | 0832748 | 4/1998 |
| EP | 0839659 | 5/1998 |

OTHER PUBLICATIONS

International Search Report for Application No. PCT/US2012/034089. Report issued Dec. 12, 2012.

*Primary Examiner* — Anh T. N. Vo
(74) *Attorney, Agent, or Firm* — HP Inc. Patent Department (57) ABSTRACT

Example fluid couplings, systems and methods are described including a fluid delivery tube for delivering fluid to a fluid supply, a fluid interconnect fitting for connection to the fluid delivery tube, a retainer for engaging the fluid interconnect fitting and a fluid supply for retaining the fluid interconnect fitting with respect to the fluid supply, and a seal feature arranged to mate with the fluid interconnect fitting and a fluid inlet of the fluid supply.

13 Claims, 11 Drawing Sheets

(56) References Cited

U.S. PATENT DOCUMENTS

| | | |
|---|---|---|
| 6,991,325 B2 * | 1/2006 | Oda et al. .................. 347/85 |
| 7,097,288 B2 | 8/2006 | Van OS et al. |
| 7,185,652 B2 * | 3/2007 | Gunaratnam et al. ... 128/205.25 |
| 8,534,815 B2 * | 9/2013 | Watanabe .................. 347/86 |
| 8,727,511 B2 * | 5/2014 | Mallory et al. ............. 347/85 |

* cited by examiner

FLUID COUPLING

BACKGROUND

Examples of fluid delivery systems include fluid supplies, regulators for regulating fluid flow and/or back pressure, and fluid dispensing heads. A fluid delivery system may be part of a wider system, for example a print system. Regulators may be provided in a fluid supply, near a fluid dispensing head or at any other suitable location in the fluid delivery system. Exchangeable or non-exchangeable fluid supplies may be provided for delivering the fluid to the fluid dispensing heads. In some systems the fluid supplies include a reservoir and a regulator. In other systems, separate reservoirs are connected to the fluid supplies. Such separate reservoirs can be connected to the respective fluid supplies through fluid delivery tubes, for replenishing the supplies.

Continuous ink supply systems include one or more separate ink reservoirs connected to ink supplies, for continuously replenishing the ink supplies with ink out of the reservoir. In other systems, such as scanning printhead systems, regulator supplies may be provided on a scanning carriage and the ink reservoirs are included in separate exchangeable ink cartridges. Regulator supplies may be connected to distant reservoirs through flexible tubes. The distant reservoirs deliver the fluid to the regulator supplies and printheads while the carriage scans. In some of these fluid delivery systems it is challenging to establish reliable fluidic couplings.

BRIEF DESCRIPTION OF THE DRAWINGS

For the purpose of illustration, certain examples constructed in accordance with the teachings of this disclosure will now be described with reference to the accompanying drawings, in which.

DETAILED DESCRIPTION

In the following detailed description, reference is made to the accompanying drawings. The examples in the description and drawings should be considered illustrative and are not to be considered as limiting to the specific example or element described. Multiple examples may be derived from the following description and/or drawings through modification, combination or variation of certain elements. Furthermore, it may be understood that examples or elements that are not literally described may be derived from the description and drawings by a person of ordinary skill in the art.

Figure 1:
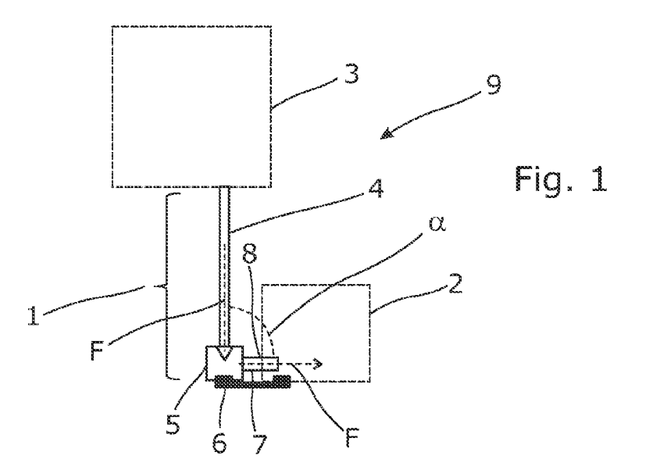
FIG. 1 illustrates a diagram of an example of a fluid coupling.

FIG. 1 illustrates an example of a fluid coupling 1 in assembled condition. As illustrated, the fluid coupling 1 can be connected to a fluid reservoir 3 and a fluid supply 2. The fluid coupling 1 is arranged to establish a fluidic connection between the fluid reservoir 3 and the fluid supply 2. The fluid coupling 1 includes a fluid delivery tube 4 for delivering fluid from the reservoir 3 to the supply 2. The fluid coupling 1 includes a fluid interconnect fitting 5 that is connected to the fluid delivery tube 4. The fluid interconnect fitting 5 is arranged to fluidically connect the fluid delivery tube 4 to the fluid supply 2. In assembled condition and in operation, fluid flows through the fluid interconnect fitting 5. For example, within the fluid interconnect fitting 5 fluid is redirected over an angle α of between 60 to 120 degrees, as indicated by fluid flow arrow F. In the illustrated example, the fluid flow F changes direction over an angle α of approximately 90 degrees. The fluid coupling 1 includes a retainer 6 that is arranged to engage the fluid interconnect fitting 5 and the fluid supply 2, for retaining the fluid interconnect fitting 5 with respect to the fluid supply 2. The fluid coupling 1 includes a seal feature 7 for sealing a connection between the fitting 5 and the supply 2. The seal feature 7 is arranged to mate with the fluid interconnect fitting 5. The seal feature 7 has an outer surface that is arranged to be inserted in a fluid inlet 8 of the fluid supply 2. In one example, the fluid inlet 8 is an integral part of the fluid supply 2, for example provided when molding the supply 2. In another example, the fluid inlet 8 is provided by drilling or otherwise providing a hole in the supply 2 after molding the supply 2.

Figure 2:
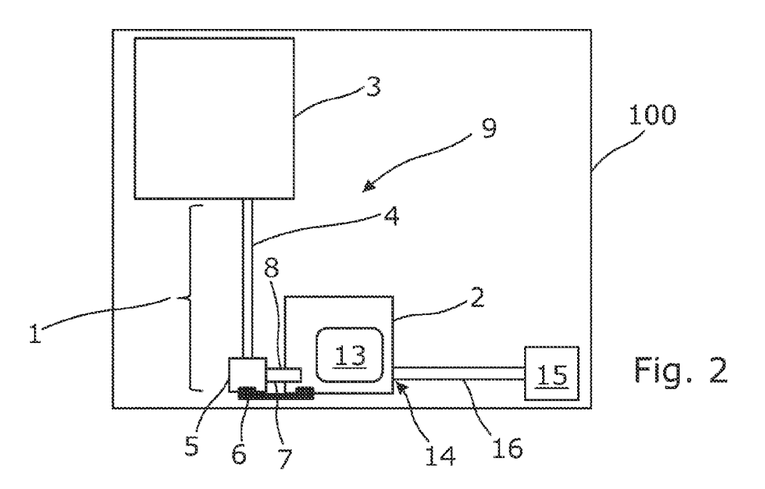
FIG. 2 illustrates a diagram of an example of a print system including a fluid coupling.

As illustrated by the example of FIG. 2, the fluid supply 2 can be a replaceable or fixed part of a fluid delivery system 9 or print system 100. In this disclosure, the fluid delivery system 9 may be understood as including the fluid coupling 1, the fluid supplies 2 and/or the fluid reservoir 3. For example, the fluid delivery system 9 is part of a print system 100. In operation, the fluid reservoir 3 replenishes the fluid supply 2 with fluid through said fluid coupling 1. For example, the fluid supply 2 supplies the fluid to a fluid dispensing head or printhead. In an example, the fluid includes ink. In a further example, the fluid supply 2 includes a regulator 13 for regulating the fluid pressure.

For example, the print system 100 includes the fluid reservoir 3, the fluid coupling 1, the fluid supply 2 and a fluid dispensing head 15. For example, the fluid supply 2 includes the fluid inlet 8. For example the fluid inlet 8 is fluidically connected to the fluid delivery tube 4, for example through the fluid interconnect fitting 5 and seal feature 7. In the illustrated example, the fluid supply 2 includes a regulator 13 for regulating a fluid pressure. For example, the regulator 13 includes at least one of a capillary medium and a flexible membrane. The flexible membrane for example includes a bag or flexible wall wherein a back pressure is established with the aid of a resilient or tensions element such as a leaf spring or other type of spring. For example, the fluid supply 2 includes a fluid outlet 14 for fluidic connection to the fluid dispensing head 15, through further fluid delivery tubes 16. For example, the fluid dispensing head 15 includes fluid ejectors, for example at least one of thermal and piezo actuators. For example, the fluid includes ink.

Figure 3:
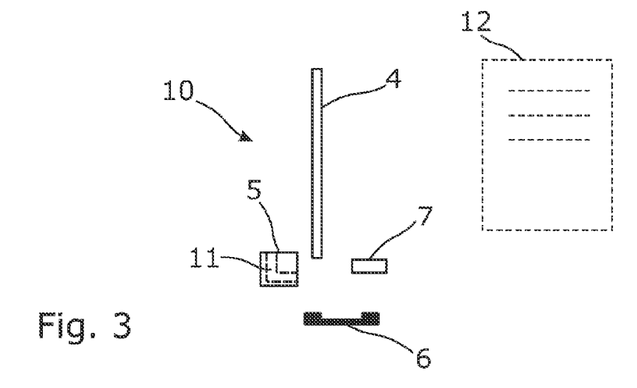
FIG. 3 illustrates a diagram of an example of a kit for assembling a fluid coupling.

FIG. 3 illustrates an example of a kit of parts 10 for assembling a fluid coupling 1 for connecting the fluid supply 2 to the fluid reservoir 3. In FIG. 3 the example kit of parts 10 is represented in a disassembled condition. The kit of parts 10 includes the fluid delivery tube 4 for connection to the fluid reservoir 3. The kit of parts 10 includes the fluid interconnect fitting 5 for connection to the fluid delivery tube 4 and the fluid supply 2. A cross section of the fluid interconnect fitting 5 is illustrated, illustrating an internal fluid channel 11 of the fluid interconnect fitting 5 that makes an angle α of between 60 to 120 degrees, in the illustrated example approximately 90 degrees. In an example (not illustrated), the internal channel 11 makes a rounded curve over 60 to 120 degrees, instead of a sharp angle as illustrated in the figure. The kit of parts includes a retainer 6 that is arranged to engage the fluid interconnect fitting 5 and the fluid supply 2, for retaining the fluid interconnect fitting 5 with respect to the fluid supply 2. For example, the retainer 6 is defined by a clip-like feature for clipping it to the fluid interconnect fitting 5 and fluid supply 2. Furthermore, the kit of parts 10 includes the seal feature 7 that is arranged to connect to the fluid interconnect fitting 5 and the fluid inlet 8 of the fluid supply 2. In a further example, the kit of parts 10 includes a set of instructions 12 for assembling the parts 2, 3, 4, 5, 6, 7 together so as to establish the fluid coupling 1 and provide for a working fluid delivery system 9. In one example, the set of instructions 12 is defined by a human readable set of instructions to allow a person to assemble the kit of parts 10. In another example, the set of instructions 12 is defined by a computer readable memory including machine readable instructions. For example the kit of parts 10 includes at least the fluid delivery tube 4, the seal feature 7, the fluid interconnect fitting 5, the retainer 6 and sub-features thereof.

In one example, the fluid reservoir 3 can hold a relatively large volume of fluid while the fluid supply 2 may act as a regulator 13 for providing fluid to a further fluid dispenser such as a printhead or other type of fluid ejector. The fluid coupling 1, or kit of parts 10 thereof, may allow for a relatively easy at least substantially liquid or gas tight fluidic coupling between the fluid supply 2 and the fluid reservoir 3. For example, the fluid coupling 1 facilitates a relatively easy fluidic coupling between at least one fluid reservoir 3 and at least one corresponding fluid supply 2, that can be established manually and/or by machine.

Figure 4:
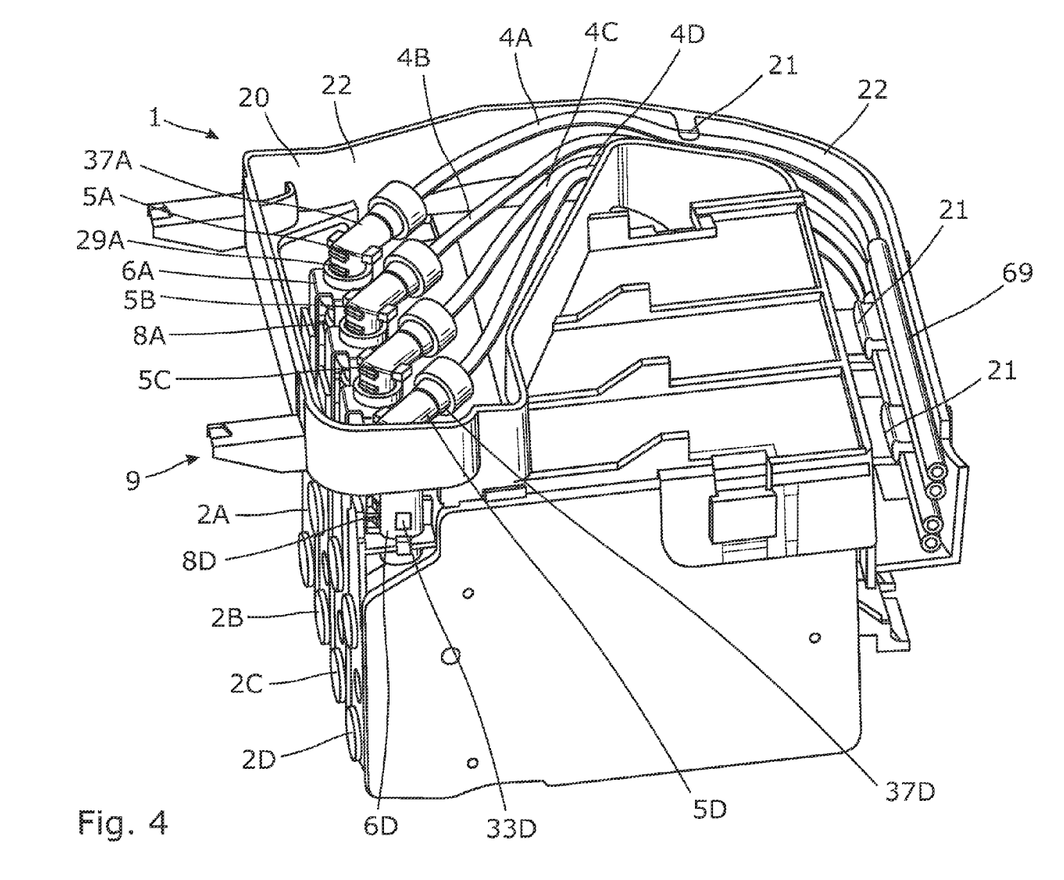
FIG. 4 illustrates a perspective view on another example of a fluid coupling.
Figure 5:
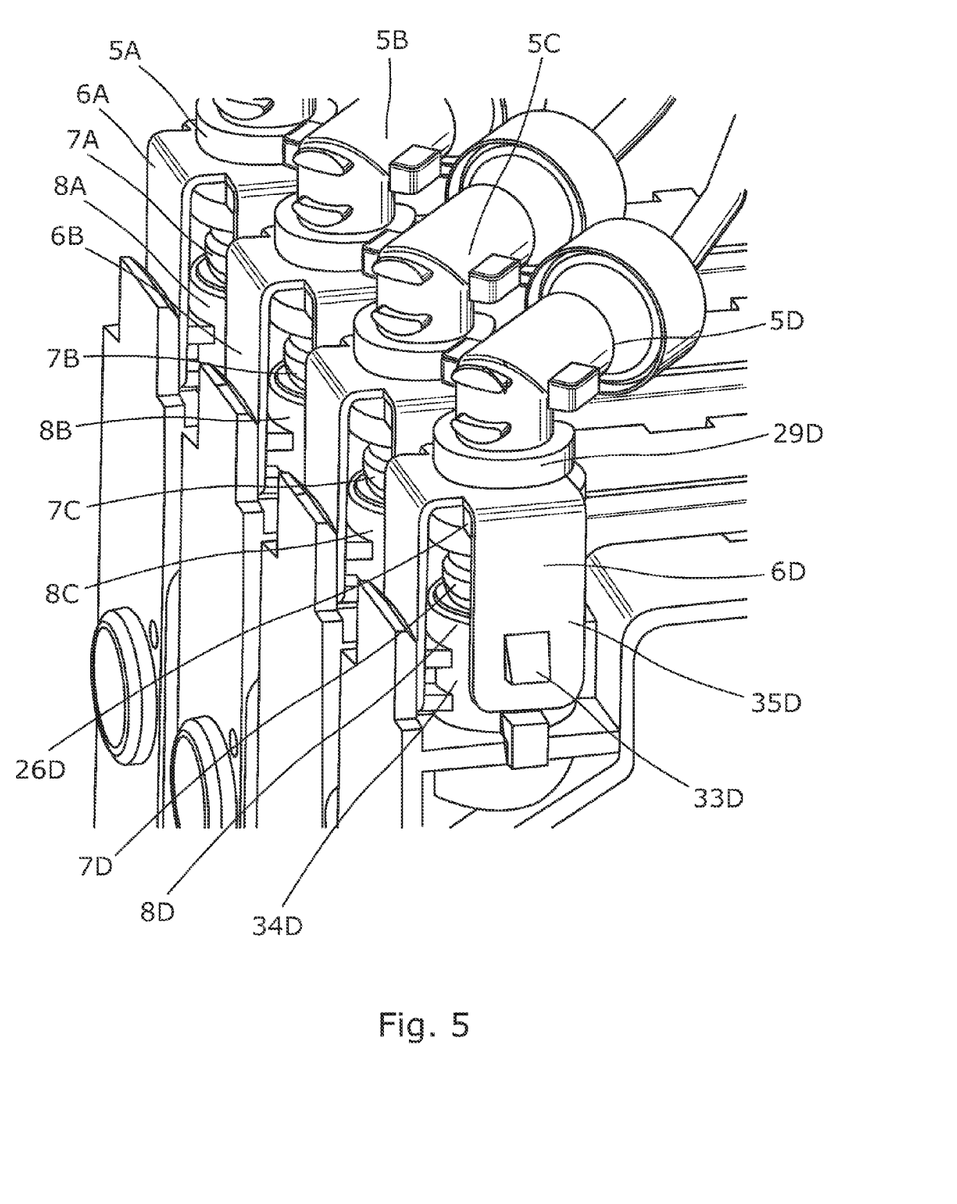
FIG. 5 illustrates a perspective view on a portion of the example fluid coupling of FIG. 4.
Figure 6:
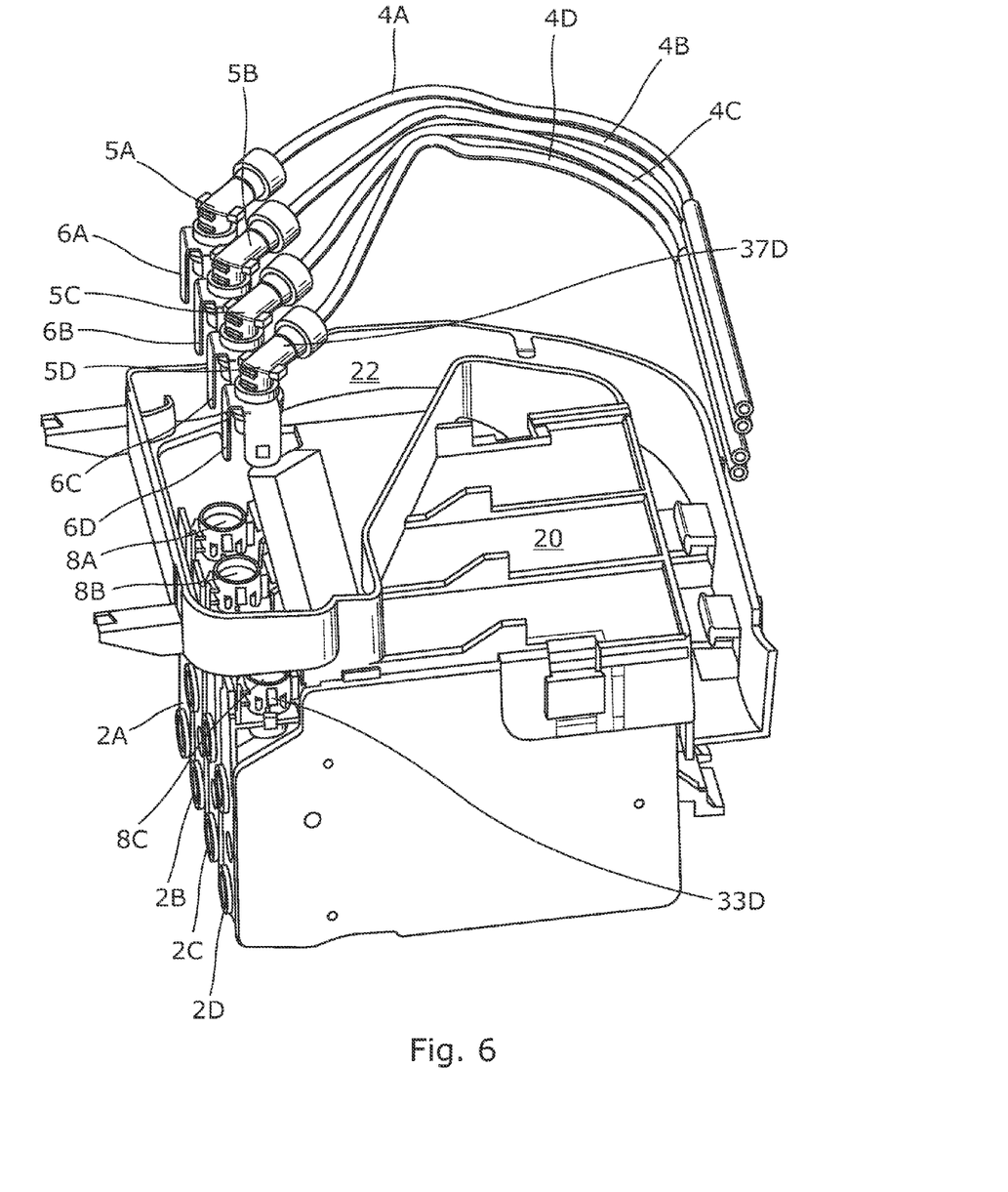
FIG. 6 illustrates a perspective, partially explosive view on the example fluid coupling of FIGS. 4 and 5.
Figure 7:
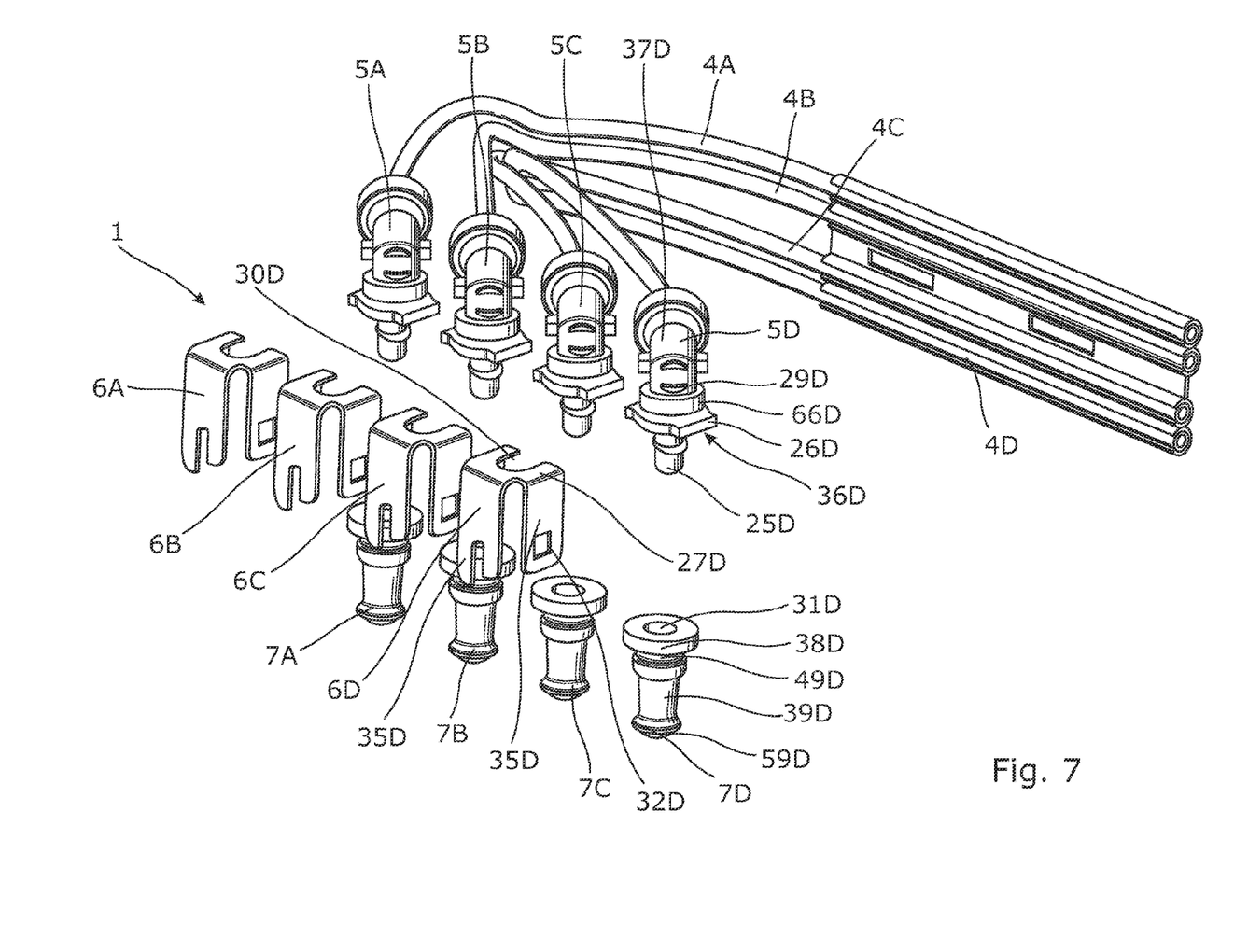
FIG. 7 illustrates a perspective, partially explosive view on another portion of the example fluid coupling of FIGS. 4-6.

FIGS. 4, 5 and 6 illustrate different views on another example of a fluid coupling 1 and multiple corresponding fluid supplies 2A-2D, wherein FIG. 7 illustrates an example fluid coupling 1 without supplies 2A-2D. As illustrated in FIG. 4, in an example the fluid coupling 1 includes a tube tray 20 that is mounted on top of the fluid supplies 2A-2D. For example, the supplies 2A-2D are existing supplies provided with adaptations for facilitating the fluid coupling 1. For example, the tube tray 20 is arranged to guide and bundle fluid delivery tubes 4A-4D to the fluid inlets 8A-8D of the respective fluid supplies 2A-2D. For example, the tube tray 20 is defined by a single cast, that is, an integrally molded plastic part. For example, the tube tray 20 is provided with retaining fingers 21 or the like to aid in bundling and retaining the fluid delivery tubes 4A-4D. For example, a separate bundling sleeve 69 is provided to aid in bundling the fluid delivery tubes 4A-4D. For example, the tube tray 20 is arranged to change a direction of the fluid delivery tubes 4A-4D over an angle of at least approximately 90°, for example between 90° and 180°. As illustrated, the fluid delivery tubes 4A-4D are redirected over a curve towards the fluid inlets 8A-8D. For example, the tube tray 20 includes a curved standing wall 22 arranged to aid in bending and guiding the fluid delivery tubes 4A-4D along said curve. For example, the curved standing wall 22 is also arranged to protect the fluid delivery tubes 4A-4D. In an example, the standing wall 22 curves over an angle of at least approximately 90°.

In an example the fluid coupling 1 includes one fluid delivery tube 4A-4D for each of four colored supplies 2A-2D for delivering each of C, M, Y, K colors to the respective supplies 2A-2D. In an example, each fluid delivery tube 4A-4D terminates in the corresponding fluid interconnect fitting 5A-5D. For example, an end of the fluid delivery tube 4A-4D may extend within the fitting 5A-5D and may be fixed to the fitting 5A-5D, so that in operation fluid can flow from the tube 4A-4D to the inner channel 11 (diagrammatically illustrated in FIG. 3) of the fitting 5A-5D. For example, the fluid interconnect fitting 5A-5D includes a neck portion 37A, D for receiving the fluid delivery tube 4A-4D, a head portion 29A, D a shoulder 26A, D and a plug 25A, D for insertion (see also FIG. 7). For example, a central axis of the neck portion 37A may have an angle with respect to a central axis of the plug 25D of between approximately 60° and approximately 120° or of approximately 90°, wherein the inner channel 11 extends through the neck portion 37D and the plug 25D. Each fluid interconnect fitting 5A-5D connects to the corresponding seal feature 7A-7D. In an example, an end of the fluid interconnect fitting 5A-5D, for example the plug 25D (FIG. 7), extends within the seal feature 7A-7D. In an example, the seal feature 7A-7D includes an inner friction fit surface for receiving and retaining the fluid interconnect fitting 5A-5D within the seal feature 7A-7D. In an example, the seal feature 7A-7D includes elastomeric material. For example, the seal feature 7A-7D extends within the fluid inlet 8A-8D. For example, the seal feature 7A-7D extends in the fluid inlet at an end thereof, or substantially completely. In an example, the outer surface of the seal feature 7A-7D includes a friction surface for retaining the seal feature 7A-7D in the fluid inlet 8A-8D (FIG. 5). For example, the plug 25D extending in the seal feature 7A-7D may strengthen the friction fit by elastically deforming the seal feature 7A-7D so that the seal feature 7A-7D presses against the inner walls of the inlet 8A-8D. The fluid coupling 1 includes retainers 6A-6D for retaining the fluid interconnect fittings 5A-5D and the seal features 7A-7D with respect to the supplies 2A-2D.

Note that for reasons of illustration in FIG. 7 sub-features of only one fluid interconnect fitting 5D, retainer 6D and seal feature 7D are indicated, but it will be appreciated that the other fluid interconnect fittings 5A-5C, retainers 6A-6C and seal features 7A-7C can have equal sub-features. In the examples of FIGS. 6 and 7, each fluid interconnect fitting 5A-5D includes a plug 25D at one end for insertion in a receiving opening 31D of the corresponding seal feature 7A-7D. The receiving opening 31D is arranged to receive the plug 25D. The receiving opening 31D is arranged to elastically expand when the plug 25D is inserted, so that the seal feature 7A-7D is tensioned and seals and retains the plug 25D in the fluid inlet 8A-8D. For example the surface of the receiving opening 31D is arranged to provide for a friction between the wall of the receiving opening 31D and the plug 25D. In an example, the fluid interconnect fitting 5A-5D includes a shoulder 26D that in assembled condition is engaged by the retainer 6A-6D. In an example, the shoulder 26D is engaged by a support surface 27D of the retainer 6A-6D. In an example, the shoulder 26D includes a flange or ring portion protruding from a head portion 29D of the fluid interconnect fitting 5A-5D. In an example, the shoulder 26D includes two opposite shoulder portions. In an example, the plug 25D protrudes from the shoulder 26D. In the illustrated example, the support surface 27D is defined by a top surface of the retainer 6A-6D having an opening 30D for receiving a head portion 29D of the fitting 5A-5D. In assembled condition, the head portion 29D of the fluid interconnect fitting 5A-5D extends through the opening 30D in the support surface 27D and the support surface 27D presses onto the shoulder 26D, thereby pressing the plug 25D in the receiving opening 31D of the seal feature 7A-7D, and thereby pressing and retaining both the plug 25D and the seal feature 7A-7D with respect to the inlet 8A-8D. In an example, as shown in FIG. 7, the head portion 29D includes a second shoulder 66D just above the shoulder 26D. For example, in installed condition, the support surface 27D of the retainer 6A-6D is held by the head portion 29D between the shoulder 26D and the second shoulder 66D. A thin slot is provided between the second shoulder 66D and the shoulder 26D for receiving the support surface 27D. Both shoulders 26D, 66D may provide for a certain friction on the support surface 27D for retaining the retainer 6A-6D in position with respect to the fluid interconnect fitting 5A-5D before clipping the fitting-retainer assembly to the fluid inlet 8A-8D. The receiving opening 31D extends between the shoulder 26D and the second shoulder 66D, around a portion of the head portion 29D that is thinner than the shoulders 26D, 66D.

In an example, the retainer 6A-6D includes at least one wing 35D. In an example, the retainer 6A-6D includes at least one retainer notch 32D, for engaging a counterpart notch 33D of the corresponding supply 2A-2D (FIGS. 5, 6, 7). In the illustrated example, the retainer notches 32D are provided in the wings 35D. For example, the retainer notches 32D include a hole or indent for hooking or clasping the retainer 6A-6D to the counterpart notch 33D. In the illustrated example, the fluid inlet 8A-8D is defined by a fluid inlet cylinder 34D.

In an example, the fluid inlet cylinder 34D and counterpart notch 33D are part of a single cast that includes a shell portion of the supply. In another example (not illustrated), the fluid inlet cylinder 34D is separately attached to the fluid supply 2A-2D. In again another example (not illustrated), the fluid inlet 8A-8D is defined by a hole drilled in the top surface of the fluid supply 2A-2D, so as to provide for the inlet opening and receive the seal feature 7A-7D.

The illustrated fluid inlet cylinder 34D is provided with one or more of said counterpart notches 33D (FIG. 5). In the illustrated examples, the counterpart notch 33D includes a ramp. In assembled condition, the fluid inlet cylinder 34D receives the seal feature 7A-7D. For example, the seal feature 7A-7D is friction fitted in the fluid inlet 8A-8D (FIG. 5). For example, the seal feature 7A-7D is arranged to be elastically deformed when inserted in the fluid inlet 8A-8D so as to press against inner walls of the fluid inlet cylinder 34D and retain its position and seal the fluid inlet 8A-8D. In assembled condition, the shoulder 26D presses onto the seal feature 7A-7D, aided by the retainer 6A-6D. In assembled condition, the support surface 30D of the retainer 6A-6D presses on the shoulder 26D. In assembled condition, the counterpart notch 33D retains the retainer notch 32D so that the fluid interconnect fitting 5A-5D and seal feature 7A-7D are retained with respect to the fluid inlet 8A-8B. The fluid interconnect fitting 5A-5D, retainer 6A-6D and seal feature 7A-7D can be readily plugged in, and clipped to, the fluid supply 2A-2D by man or machine, thereby establishing a reliable fluid coupling 1.

For example, the retainer 6A-6D is defined by a dip-like arrangement (FIG. 7). For example, the retainer 6A-6D includes two, three or four wings 35D extending at an approximately straight angle from the support surface 27D. For example, the wings 35D are arranged to be resilient so as to bend outwards when being pushed with sufficient force over the ramp of the counterpart notch 33D and bends inwards when an edge of the retainer notch 32D passes over the end of the ramp of the counterpart notch 33D. Hence, the edge of the retainer notch 32D is retained by the counterpart notch 33D. For example, these actions can be referred as "clipping". In this way, the fluid interconnect fitting 5A-5D, the retainer 6A-6D and the seal feature 7A-7D can be inserted in, and locked to, the fluid inlet 8A-8D in one movement.

As illustrated in FIG. 7, in an example the seal feature 7A-7D includes a seal disc 38D for engagement with the support surface 27D of the retainer 6A-6D. The seal disc 38D includes the receiving opening 31D for receiving the plug 25D. For example, the seal feature 7A-7D includes a longitudinally shaped cylindrical seal portion 39D protruding from the seal disc 38D that in assembled condition extends within the fluid inlet cylinder 34D. For example, the cylindrical seal portion 39D includes ring shaped seal portions 49D that provide for extra friction as compared to the neighboring portions of the seal feature 7A-7D, and/or have increased stiffness with respect to neighboring portions of the seal feature 7A-7D. For example, one ring-shaped seal portion 49D is arranged near the disc 38D. For example, a second ring-shaped seal portion 59D is arranged near an end of the cylindrical seal portion 39D for further safeguarding of seal and friction properties of the seal feature 7A-7D.

As illustrated in the examples of FIGS. 4-7, the retainer 6A-6D and fluid interconnect fitting 5A-5D are arranged so that a rotational orientation of the fluid interconnect fitting 5A-5D with respect to the fluid inlet 8A-8D is predefined. For example, the fluid interconnect fitting 5A-5D has a predefined and fixed rotational orientation with respect to the supply 2A-2D in assembled condition. For example, the rotational orientation of an engagement surface 36D of the shoulder 26D with respect to the neck portion 37D determines the rotational orientation of the neck portion 37D with respect to the fluid inlet 8A-8D. For example, as can be seen from FIG. 4, the neck portions 37D are oriented to facilitate a convenient orientation of the fluid delivery tubes 4A-4B, close to the fluid interconnect fitting 5A-5D. For example, the engagement surface 36D of the shoulder 26D is defined by a rectangular or straight edge feature that predefines the rotational orientation of the fluid interconnect fitting 5A-5D in the fluid inlet 8A-8D. The engagement surface 36D is arranged to engage one of the wings 35D of the retainer 6A-6D. The engagement surface 36D engages the wing 35D so that the engagement surface 36D in engaged condition is impeded from rotating with respect to the retainer 6A-6D. The engagement surface 36D has a predefined orientation with respect to the neck portion 37D to define the orientation of the neck portion 37D with respect to the fluid inlet 8A-8D. For example, a tangential of the engagement surface 36D has a non-straight angle and is not parallel to a central axis of the neck portion 37D so that also the central axis of the neck portion 37D does not have a parallel orientation and no straight angle with respect to a side wall of the supply 2A-2D. For example, the predefined rotational orientation is chosen according to a convenient placement of the fluid delivery tubes 4A-4D.

Figure 8:
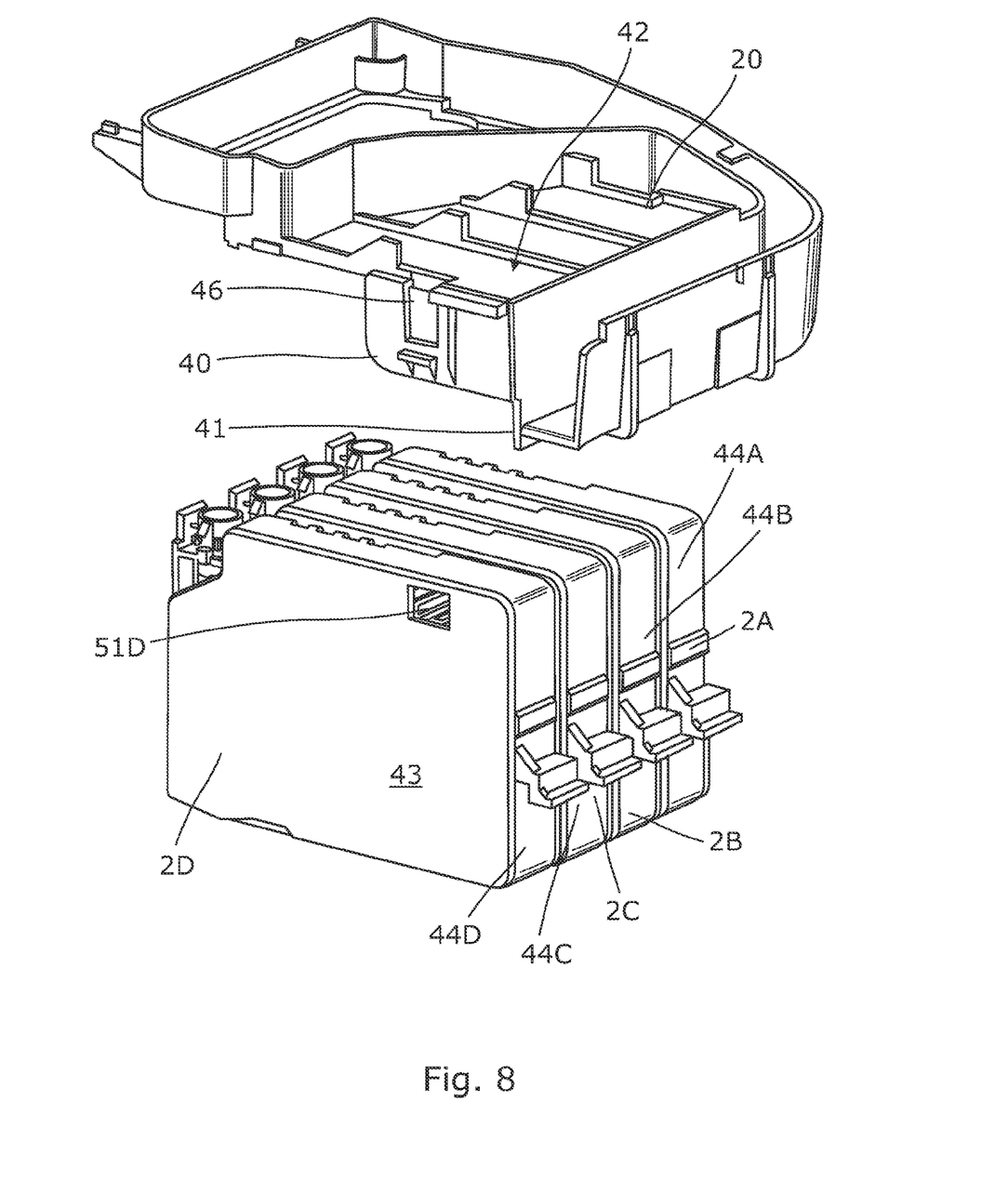
FIG. 8 illustrates a different perspective, explosive view on again different portions of the example fluid coupling of FIGS. 4-7
Figure 9:
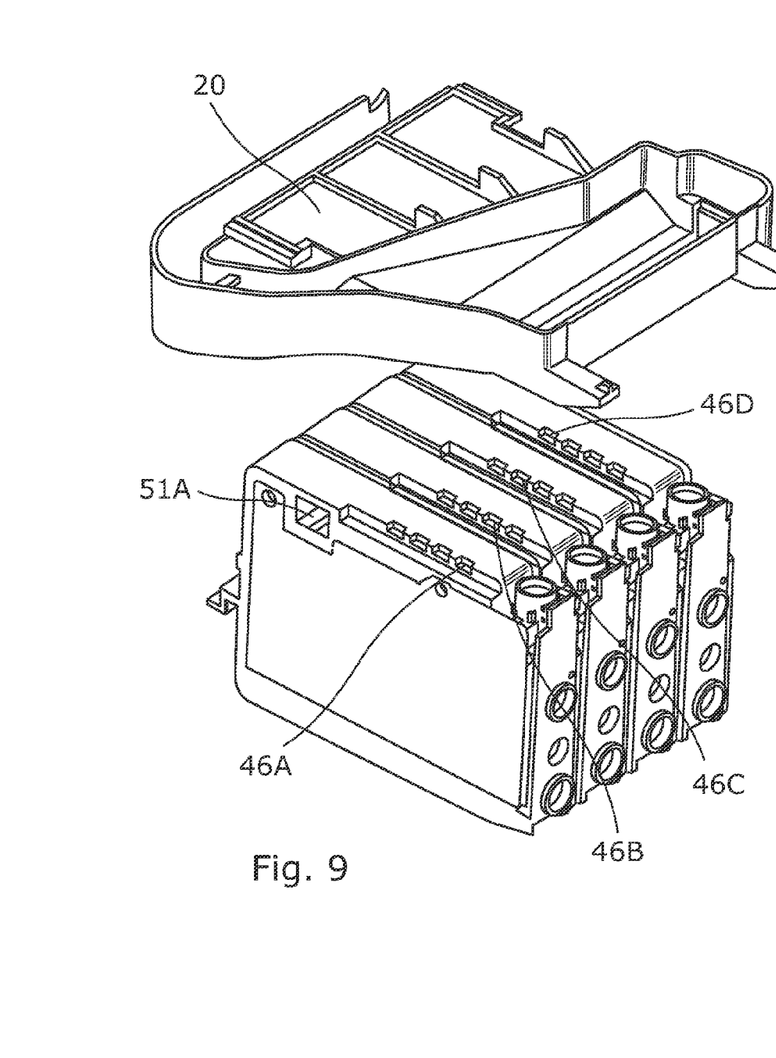
FIG. 9 illustrates another perspective, explosive view of the portions of FIG. 8.
Figure 10:
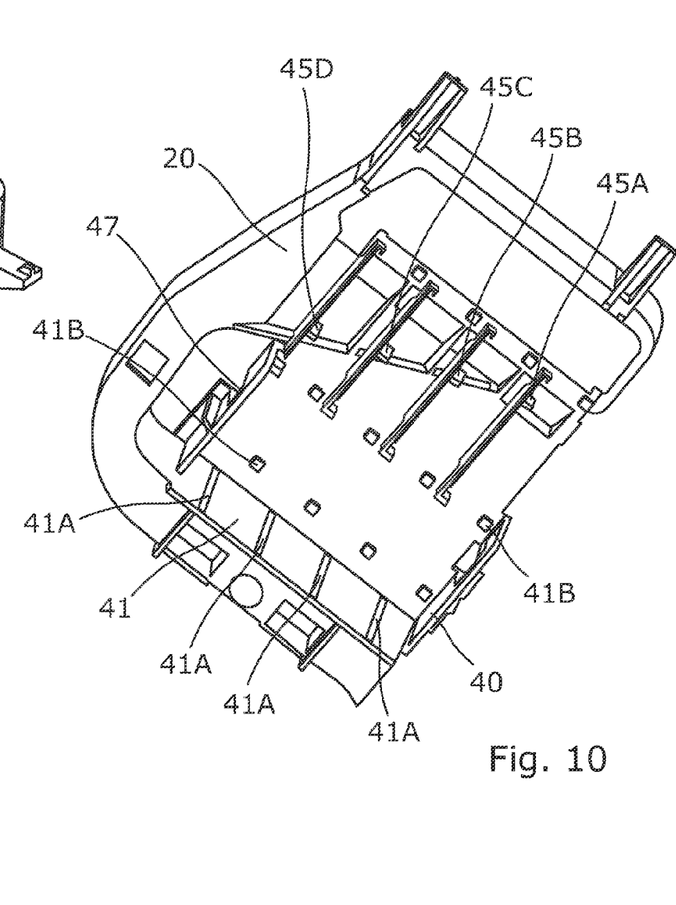
FIG. 10 illustrates a perspective view on a bottom of a tube tray of the example fluid coupling of FIGS. 4-9.

FIGS. 8-10 illustrate examples of multiple views onto the tube tray 20. The tube tray 20 is arranged to be mounted onto the supplies 2A-2B. For example the tube tray 20 includes at least one alignment feature 40, 41 for aligning the tube tray 20 with respect to the supplies 2A-2B. For example, the at least one alignment feature 40, 41 includes at least one side wall 40 that protrudes downwards from a bottom plane 42 of the tube tray 20. The at least one side wall 40 is arranged to engage a side wall 43 of one of the side supplies 2A, 2D. For example, the at least one alignment feature 40, 41 includes a back wall 41 that protrudes downwards from the bottom plate 42. For example, further alignment features 40, 41 include protrusions 41A, 41B included in the bottom plate 42 or one of the side or back walls 40, 41. For example, the back wall 41 includes at least one alignment rib 41A and at least one alignment notch 41B for better alignment of the tray 20 with respect to the supplies 2A-2D. The back wall 41 is arranged to engage the back surfaces 44A-44D of the fluid supplies 2A-2D. The back wall 41 and side wall 40 of the tube tray 20 can be used to align the tube tray 20 with respect to the supplies 2A-2D.

For example, the tube tray 20 includes at least one key feature 45A-45D (FIGS. 9, 10). For example, the supplies 2A-2D include at least one corresponding supply key feature 46A-46D. In the illustrated example, the tube tray key feature 45A-45D is arranged to communicate with at least one corresponding supply key feature 46A-46D on the supply 2A-2D for example to prevent that incorrect supplies 2A-2D are connected to the tube tray 20, or to prevent incorrect positioning of the tube tray 20 with respect to each of the supplies 2A-2D. In the illustrated example, the supply key features 46A-46D include indents in respective supply top surfaces. For example, the tube tray key features 45A-45D include protrusions for at least partial insertion in the respective indents. In the illustrated example, each supply 2A-2D includes equal supply key features 46A-46D.

In another example (not illustrated) each supply key features 46-46D has a position that is specific for the color in the supply 2A-2D, wherein a different color in the supply 2A-2D corresponds to a different position of the supply key feature 46A-46D, wherein also each tube tray key feature 45A-45D has a specific position defined by the corresponding supply key feature position. In such example, the respective key features 45A-45D, 46A-46D enable that the positions of each specific color supply 2A-2D with respect to the tube tray 20 are predefined.

The key features 45A-45D, 46A-46D may prevent improper positioning of the supplies 2A-2D with respect to the tube tray 20, or prevent that wrong supplies 2A-2D are connected to the tube tray 20. For example, it may be prevented that a fluid interconnect fitting 5A-5D is connected to a non-corresponding color supply 2A-2D or a non-authentic supply 2A-2D.

Figure 11:
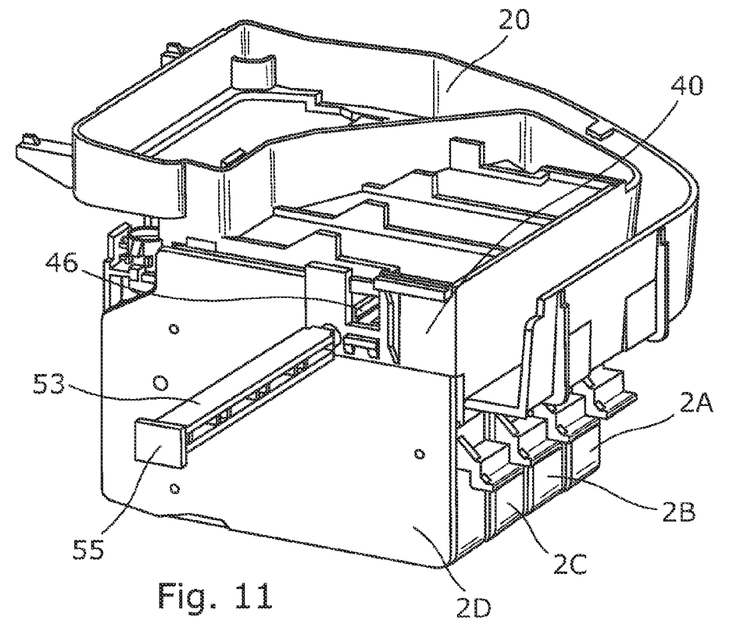
FIG. 11 illustrates a perspective view on different portions of the example fluid coupling of FIGS. 4-10, the portions being partially disassembled.
Figure 12:
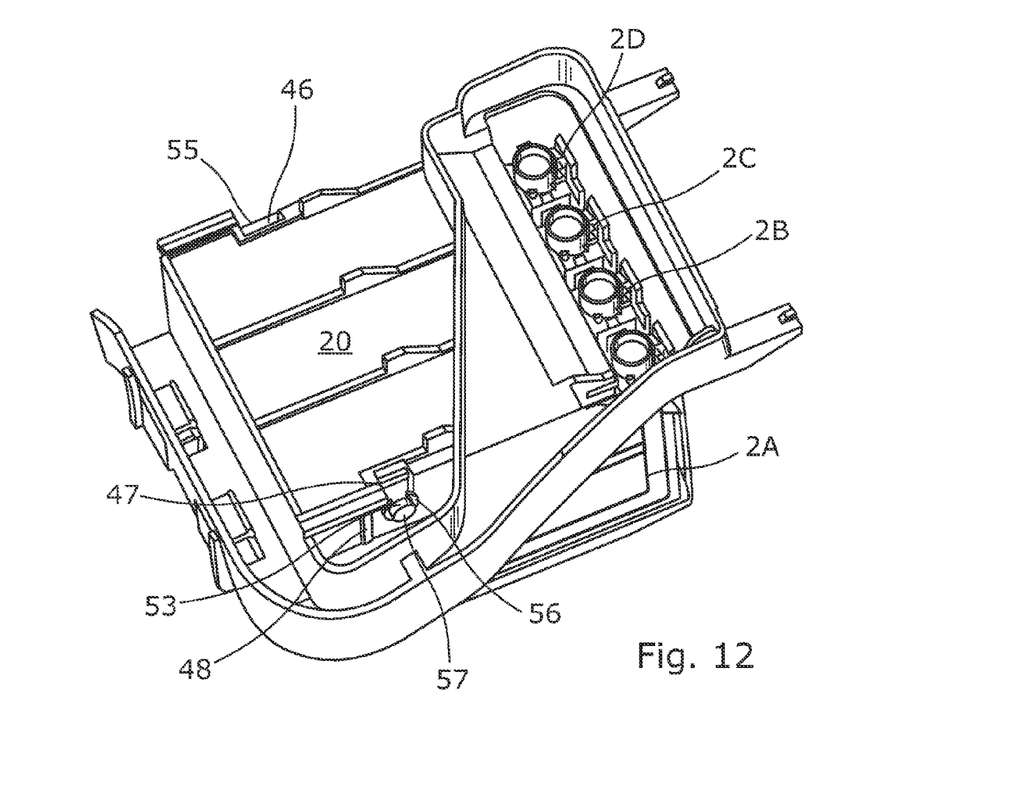
FIG. 12 illustrates a different perspective view of the portions of FIG. 11, in assembled condition.

FIGS. 11 and 12 illustrate an example of an assembly of the tube tray 20 and the supplies 2A-2D. In the example, the tube tray 20 includes a first locking feature. In the example, the first locking feature includes a slot 46 in the side wall 40. For example, the first locking feature includes a second slot 47 in an opposite side wall 48 of the tube tray 20. For example, the fluid supplies 2A-2D include a second locking feature. For example, the second locking feature includes a slot 51A-51D in the fluid supply 2A-2D, near the top surface of the fluid supply 2A-2D. For example, the slot 51A-51D is defined by a through hole. FIGS. 8 and 9 provide a clear view on example fluid supply slots 51A-51D. For example, the fluid supply slots 51A-51D are arranged in line with the tube tray slots 46, 47. For example, a second retainer feature is provided. For example, the second retainer feature includes a bar 53. For example, the second retainer feature is arranged to engage the first and second locking feature for retaining the tube tray 20 with respect to the fluid supplies 2A-2D. For example, the bar 53 is arranged to slide through the supply and tube tray slots 51A-51D, 46, 47 so as to retain the tube tray 20 with respect to the supplies 2A-2D. For example, the bar 53 retains portions of the side walls 47, 48. For example, opposite ends of the bar 53 engage the opposite side walls 47, 48 of the tube tray 20. For example, the bar 53 includes a stop 55 at one end. For example, a clip 56 is provided at an opposite end of the bar 53 with respect to the stop 55. For example, the opposite end of the bar 53 includes a protrusion 57 for attaching the clip 56. For example, the dip 56 includes a pin, ring or hook. For example, the clip 56 is arranged to be attached to the opposite end of the bar 53 for locking the bar 53 with respect to the tube tray 20 and the supplies 2A-2D. For example, the stop 55 and the clip 56 prevent that the bar 53 slides out of the slots 51A-51D, 46, 47. During assembly, the bar 53 is pushed through the first and second locking features 51A-51D, 46, 47 until the stop 55 engages the side wall of the supplies 2A-2D. Then the clip 56 is attached to the bar 53 for locking the bar 53, and therewith the tube tray 20, in place.

Figure 13:
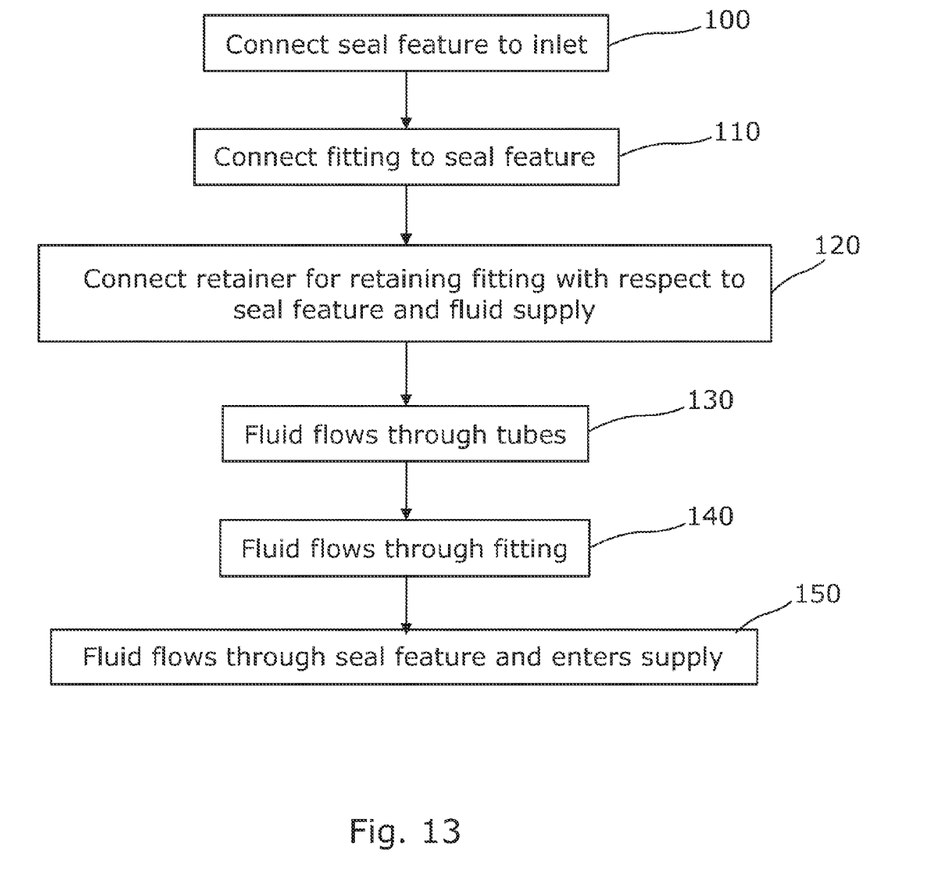
FIG. 13 illustrates a flow chart of an example of a method of establishing a fluidic connection.

FIG. 13 illustrates a flow chart of a method of establishing a fluidic connection between a fluid supply 2A-2D and a fluid delivery tube 4A-4D. For example, the fluid delivery tube 4A-4D is connected to at least one fluid reservoir 3. For example, the method includes connecting a seal feature 7, 7A-7D to an inlet 8, 8A-8D of the fluid supply 2, 2A-2D (block 100). For example, the method includes connecting the fluid interconnect fitting 5, 5A-5D to the seal feature 7, 7A-7D (block 110). For example, the method includes connecting a retainer 6, 6A-6D so that the retainer 6, 6A-6D retains the fluid interconnect fitting 5, 5A-5D with respect to the seal feature 7, 7A-7D and the fluid supply 2, 2A-2D (block 120). For example, the retainer 6, 6A-6D includes a clip for clipping to the fluid interconnect fitting 5, 5A-5D and the fluid inlet 8, 8A-8D. For example, the method includes fluid flowing through the fluid delivery tubes 4, 4A-4D (block 130), for example out of a connected reservoir 3. For example, the method includes fluid flowing from the fluid delivery tubes 4, 4A-4D through the fluid interconnect fitting 5, 5A-5D (block 140). For example, the fluid flows through the fluid interconnect fitting 5, 5A-5D, changing a fluid flow direction F between approximately 60° and approximately 120°, or approximately 90° in the inner channel 11. For example, the method includes the fluid flowing through the seal feature 7, 7A-7D and into the supply 2A-2D (block 150). In a further example, the method of FIG. 13 is described in a set of instructions 12 for allowing the method to be executed by man or machine.

Figure 14:
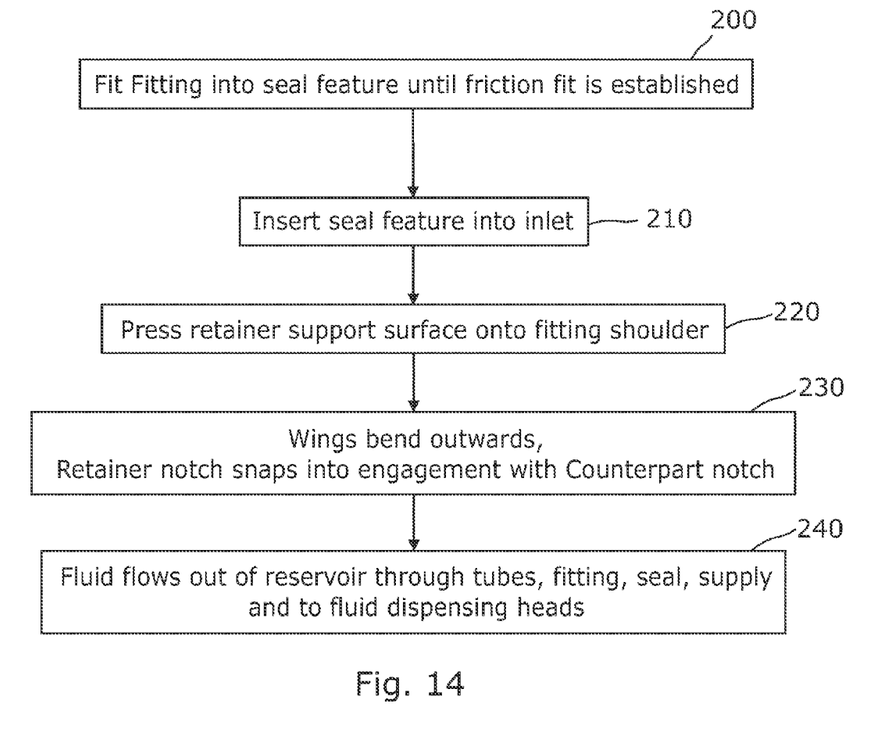
FIG. 14 illustrates a flow chart of another example of a method of establishing a fluidic connection

FIG. 14 illustrates a flow chart of a further example of a method of establishing a fluidic connection. For example, the method concerns a fluidic connection between the at least one reservoir 3 and the supplies 2, 2A-2D. For example, the method includes pressing the fluid interconnect fitting 5, 5A-5D into the seal feature 7, 7A-7D (block 200). For example, the fluid interconnect fitting 5, 5A-5D expands the seal feature 7, 7A-7D and/or a friction fit is established between the fluid interconnect fitting 5, 5A-5D and the seal feature 7, 7A-7D. For example, the method includes inserting the seal feature 7, 7A-7B in the fluid inlet 8A-8D (block 210). For example, an at least partial deformation of the seal feature 7, 7A-7D and/or a friction fit can provide for better seal properties. For example, the method includes pressing the retainer's support surface 27D onto the shoulder 26D (block 220) of the fluid interconnect fitting 5, 5A-5D. For example, the method includes pressing the retainer 6, 6A-6D further towards the fluid inlet 8, 8D-8D so that the retainer wings 35D bend outwards, over the counterpart notch's ramp, until the retainer notch 32D snaps into engagement with the counterpart notch 33D, for locking the fluid interconnect fitting 5, 5A-5D to the fluid inlet 8, 8A-8D (block 230). In this way, the fluidic interconnection between the reservoir 3 and the supplies 2, 2A-2D may be established. For example, fluid starts flowing from the reservoir 3, through the fluid delivery tubes 4, 4A-4D, through the fluid interconnect fitting 5, 5A-5D and the seal feature 7, 7A-7D into the fluid inlet 8, 8A-8D and the supply 2, 2D-2D (block 240). For example, the fluid flows from the supply 2, 2A-2D to a fluid dispensing head 15 for fluid ejection.

Figure 15:
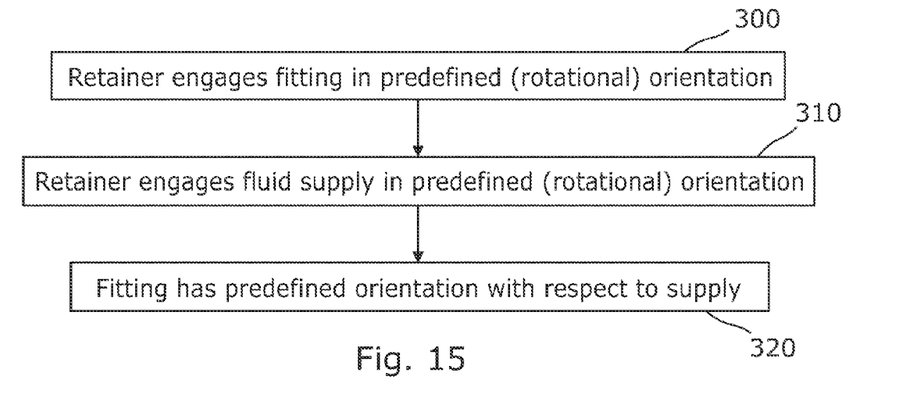
FIG. 15 illustrates a flow chart of a portion of another example of a method of establishing a fluidic connection.

FIG. 15 illustrates a flow chart of a further example of a method of establishing a fluidic connection. For example, the method includes the retainer 6, 6A-6D engaging the fluid interconnect fitting 5, 5A-5D in a predefined rotational orientation (block 300). For example, the rotational orientation is predefined by the relative positions of the neck portion 37D and the engagement surface 36D, and the retainer wing 35D. For example, the method includes the retainer 6, 6A-6D engaging the fluid supply 2, 2A-2D in a predefined rotational orientation (block 310). For example, the relative positions of retainer notch 32D and the counterpart notch 33D determine the orientation of the retainer 6, 6A-6D with respect to the fluid supply 2, 2A-2D. For example, the method results in the fluid interconnect fitting 5, 5A-5D having a predefined orientation with respect to the supply 2, 2D-2D (block 320). For example, the neck portion 37D is oriented to allow convenient placement of the fluid delivery tubes 4A-4D.

Figure 16:
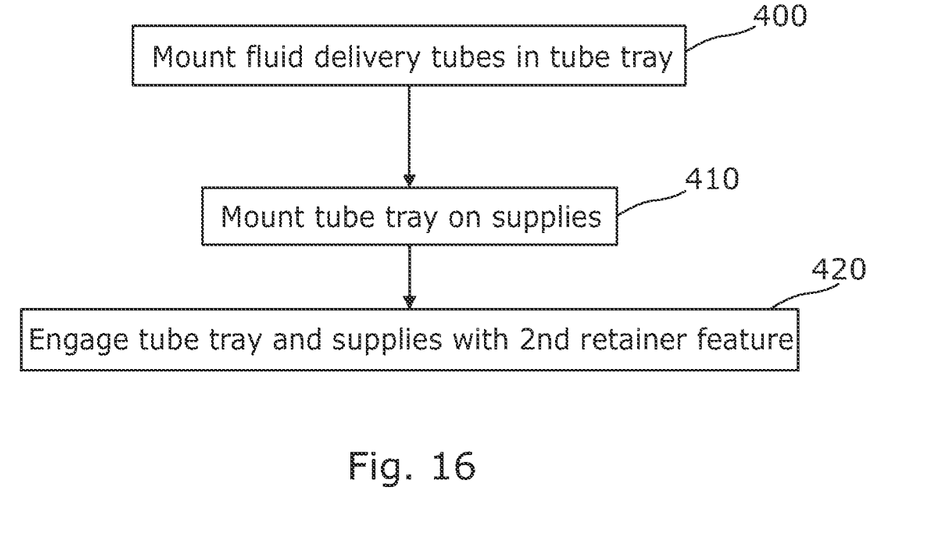
FIG. 16 illustrates a flow chart of a portion of another example of a method of establishing a fluidic connection.

FIG. 16 shows a flow chart of a further example of a method of establishing a fluidic connection. The example method includes mounting fluid delivery tubes 4A-4D onto the tube tray 20 (block 400). For example the fluid delivery tubes 4A-4D are clipped under the retaining fingers 21. The example method includes mounting the tube tray 20 on top of the supplies 2A-2D (block 410). For example the tube tray 20 is aligned with respect to the supplies 2A-2D with the aid of alignment walls 40, 41 and keyed with respect to the supplies 2A-2D with the aid of key features 45A-45D, 46A-46D. The example method includes the second retainer feature engaging the tube tray 20 and the fluid supplies 2A-2D for retaining the tube tray 20 with respect to the fluid supplies 2A-2D (block 420). For example, the bar 53 is slit through the slots 46, 47, 51A-51D of the tube tray 20 and the supplies 2A-2D. For example, the example method of FIG. 16 may be executed before any of the example methods of FIGS. 13-15.

For example, the disclosed examples of fluid couplings 1 can be applied in print systems 100. For example, the disclosed examples can be used in a continuous ink supply system or in a lifetime supply printer. For example, the disclosed examples can be used in other fluid dispensing systems including but not limited to pharmaceutical applications, titration devices, fluid sampling devices, etc.

The above description is not intended to be exhaustive or to limit this disclosure to the examples disclosed. Other variations to the disclosed examples can be understood and effected by those of ordinary skill in the art from a study of the drawings, the disclosure, and the claims. The indefinite article "a" or "an" does not exclude a plurality, while a reference to a certain number of elements does not exclude the possibility of having more or less elements. A single unit may fulfil the functions of several items recited in the disclosure, and vice versa several items may fulfil the function of one unit. Multiple alternatives, equivalents, variations and combinations may be made without departing from the scope of this disclosure.

The invention claimed is:

1. A fluid coupling comprising
a fluid delivery tube for delivering fluid to a fluid supply,
a fluid interconnect fitting connected to the fluid delivery tube, arranged to fluidically connect the fluid delivery tube to the fluid supply,
a retainer arranged to engage the fluid interconnect fitting and the fluid supply for retaining the fluid interconnect fitting with respect to the fluid supply,
a seal feature arranged to mate with the fluid interconnect fitting and having an outer surface that is arranged to be received in a fluid inlet of a fluid supply, and
a tube tray arranged to guide multiple fluid delivery tubes, redirect the fluid delivery tubes over an angle of at least approximately 90°, and be mounted on top of multiple fluid supplies.

2. The fluid coupling of claim 1, the fluid interconnect fitting including an inner channel that is arranged to redirect a fluid flow direction between 60 and 120 degrees.

3. The fluid coupling of claim 1, wherein the seal feature comprises an inner friction fit surface for inserting the fluid interconnect fitting at one end, and an outer friction fit surface to be inserted into the fluid supply.

4. The fluid coupling of claim 1, wherein
the fluid interconnect fitting comprises a shoulder,
the retainer includes a support surface for engaging the shoulder, and
the retainer includes at least one retainer notch for engaging a counterpart notch of the fluid supply for clipping the retainer to the fluid supply.

5. The fluid coupling of claim 1, wherein the retainer and the fluid interconnect fitting are arranged to have a predefined rotational orientation with respect to each other, in assembled condition.

6. The fluid coupling of claim 1, wherein
the tube tray comprises a first locking feature,
at least one of the fluid supplies comprises a second locking feature, and
a second retainer feature is provided that is arranged to engage the first and second locking feature for retaining the tube tray with respect to the fluid supplies.

7. The fluid coupling of claim 1, wherein the tube tray comprises
at least one alignment feature for aligning the tube tray with respect to the supplies, and
at least one key feature that is arranged to
communicate with a corresponding supply key feature of a supply for properly connecting the tube tray with the supply, and
provide for improper positioning when it is connected with a different supply than said supply with said corresponding supply key feature.

8. The fluid coupling of claim 1, comprising a fluid inlet cylinder arranged to
be located on or near a top surface of the fluid supply,
provide for an inlet opening in the fluid supply,
receive the respective seal feature, and
allow the retainer to engage the fluid inlet cylinder to retain the fluid interconnect fitting and the seal feature with respect to the cylinder.

9. The fluid coupling of claim 8, the fluid inlet cylinder comprising at least one counterpart notch arranged to engage a first retainer notch in a predefined rotational orientation of the retainer with respect to the fluid inlet cylinder.

10. A print system comprising
the fluid coupling of claim 1, and
a fluid supply connected to the fluid coupling, the fluid supply comprising
    a fluid inlet fluidically connected to the fluid delivery tube, and
    a fluid outlet for fluidic connection to a fluid dispensing head, wherein
the seal feature extends at least partially in the fluid inlet, and
the fluid supply includes a regulator to regulate fluid flow from the fluid delivery tube to the fluid dispensing head.

11. A method of establishing a fluidic connection between a fluid supply and a fluid delivery tube, comprising
    inserting a seal feature into an inlet of the fluid supply,
    connecting a fluid interconnect fitting to the seal feature,
    connecting a retainer to the fluid interconnect fitting and the fluid supply to retain the fluid interconnect fitting and seal feature with respect to the fluid supply,
    fluid flowing through the fluid delivery tube, fluid interconnect fitting and seal feature, into the fluid supply,
    mounting the fluid delivery tube in a tube tray,
    mounting the tube tray on the fluid supply, and
    a second retainer feature engaging the tube tray and the fluid supply for retaining the tube tray with respect to the fluid supply.

12. The method of claim 11, comprising
    pressing the fluid interconnect fitting into the seal feature until a friction fit is established between the fitting, seal feature and inlet,
    placing a retainer support surface onto a shoulder of the fluid interconnect fitting, and
    pressing the retainer towards the fluid inlet until a retainer notch snaps into engagement with a counterpart notch of the fluid supply for locking the fluid interconnect fitting with respect to the fluid inlet.

13. A kit of parts for assembling a fluid coupling for connecting a fluid reservoir to a fluid supply, comprising
    a fluid delivery tube for delivering fluid from the fluid reservoir to the fluid supply,
    a fluid interconnect fitting for connection to the fluid delivery tube, arranged to fluidically connect the fluid delivery tube to the fluid supply,
    a retainer arranged to engage the fluid interconnect fitting and the fluid supply for retaining the fluid interconnect fitting with respect to the fluid supply,
    a seal feature arranged to mate with the fluid interconnect fitting and having an outer surface that is arranged to be received in a fluid inlet of a fluid supply, and
    a tube tray arranged to guide multiple fluid delivery tubes, redirect the fluid delivery tubes over an angle of at least approximately 90°, and be mounted on top of multiple fluid supplies.

\* \* \* \* \*